United States Patent
Bauer et al.

(10) Patent No.: US 7,281,216 B2
(45) Date of Patent: Oct. 9, 2007

(54) METHOD AND APPARATUS OF SELECTING LOCAL OR REMOTE PROCESSING

(75) Inventors: Mathias Bauer, Hamburg (DE); Jörg Heilig, Hamburg (DE)

(73) Assignee: Sun Microsystems, Inc., Menlo Park, CA (US)

( * ) Notice: Subject to any disclaimer, the term of this patent is extended or adjusted under 35 U.S.C. 154(b) by 366 days.

(21) Appl. No.: 10/012,315

(22) Filed: Dec. 12, 2001

(65) Prior Publication Data
US 2002/0073146 A1 Jun. 13, 2002

(30) Foreign Application Priority Data
Dec. 13, 2000 (EP) .................. 00126589

(51) Int. Cl.
G06F 3/00 (2006.01)
G06F 9/00 (2006.01)
G06F 17/00 (2006.01)

(52) U.S. Cl. .................. 715/764; 715/748; 715/738; 715/739

(58) Field of Classification Search .............. 345/536, 345/738, 739, 740, 809; 709/202, 204, 232; 715/536, 738, 739, 740, 809, 764
See application file for complete search history.

(56) References Cited

U.S. PATENT DOCUMENTS 5,179,658 A * 1/1993 Izawa et al. ................ 345/536
5,838,906 A * 11/1998 Doyle et al. ................ 709/202
6,003,067 A * 12/1999 Suzuki et al. ............... 709/204
6,119,166 A * 9/2000 Bergman et al. ............ 709/232
6,721,795 B1 * 4/2004 Eldreth ........................ 709/232

FOREIGN PATENT DOCUMENTS

GB 2315891 A 2/1998

OTHER PUBLICATIONS

Calabria et al., Sams Teach Yourself Microsoft Windows 2000 Professional in 10 Minute, Jan. 21, 2000.*

* cited by examiner

*Primary Examiner*—Kristine Kincaid
*Assistant Examiner*—Boris Pesin
(74) *Attorney, Agent, or Firm*—Sonnenschein, Nath & Rosenthal

(57) ABSTRACT

A user is provided with the choice of selecting either a client or a server for providing either local or remote services on a data file, respectively, if both the server and the client have the resources for the desired service. The user may select the client or the server upon requesting a particular operation or service on a data file or may enter pre-selections according to which of the client or the server will be selected for execution of the operation. A client program and a server program for providing the service may be divided into at least two modules and the client and server may be selected for executing the first and second modules.

20 Claims, 11 Drawing Sheets

METHOD AND APPARATUS OF SELECTING LOCAL OR REMOTE PROCESSING

This present application claims priority from EP 00126589.1, having a filing date of Dec. 13, 2000, the contents of which are herein incorporated by reference.

BACKGROUND OF THE INVENTION

1. Field of the Invention

The present invention relates to allowing a user to choose between either local or remote processing of a data file in a client and server system, such that the service or operation provided may be optimized.

2. Description of the Related Art

Computers may be conveniently used for the widest range of applications, e.g. ranging from simple editing of text documents to complex distributed applications involving a large number of data processing units and involving the transfer of data between the data processing units.

With the growing number of data processing units having access to computer networks, such as to local area networks or worldwide networks (i.e., company wide intranets or the Internet), a growing number of applications are offered which involve a plurality of data processing units. Such applications may be for example, found in the field of home banking, office applications, remote e-mail applications, supercomputing applications and the like.

Conventional applications include where one data processing unit serves as a client and communicates with another data processing unit acting as a server. In such a scenario, the client may request the execution of an application at the server and may receive a processing result from the server via a network or communication link connecting the client and server.

Further, systems are known where a plurality of clients may connect to a portal for executing applications. A portal may be a large site in a network including a plurality of servers that provide a variety of services including, for example, office applications, searching functions, news functions, e-mail applications, discussion groups, online shopping and links to other sites in a network. A portal may thus be a general purpose site offering the capability to perform applications on behalf of a client or assisting a client in executing the application.

Generally, in a client and server or portal scenario the server may be a large computing device which has the resources to store and execute application programs which are used in providing service to a client. Since the applications and sufficient computing power is generally available at a server, the client may be a data processing unit with lesser computing resources functioning as an interface to receive user commands required to execute the desired application program in providing the requested service, i.e., to transmit commands from the client to the server, and further to receive and, for example, display computation results from the server.

For example, in case a user at a client wishes to access a document, e.g., a web-page available at the server or another location, the server retrieves the requested web-page and prepares, i.e. renders, the web-page for display at the client. Subsequently, display frames for local visualization at the client are transmitted from the server to the client and the user can view the desired web-page.

In case the client, for example, wishes to scroll through the document, a corresponding input command is received at the client and transmitted via the network to the server which prepares a corresponding display content for transfer to the client in order to enable the client to locally visualize the changed display content. Similarly, in case the user wishes to edit the document, respective commands could be transmitted from the client to the server and accordingly be processed at the server. Changed display contents are then transmitted to the client for local visualization.

However, it is possible that not only the server has the necessary resources to provide a desired service—a client may already have the required resources for providing the service, such as rendering operations or editing a data file. Corresponding application programs may thus be available at both the client side and the server side for performing a desired operation, i.e., providing a desired service.

Usually, in a case where an application program is available at a server and at a client for providing a specific operation or service, upon receiving a corresponding instruction at the client, the client proceeds to activate the application program available at the client unit in providing the desired operation or service. For example, in case an application for providing an editing service is available at both the client and the server, upon receiving an editing command, the client will generally select the locally available application programs for editing a file.

However, in this case a data file may need to be transmitted to the client which, for a large data file, may incur increased processing time. Specifically, it may be particularly inconvenient to provide a service locally at the client in case a data file to be handled is maintained at the server, as in this case, the data file would be transmitted to the client and back to the server after a service session. If the client is connected to the server via a low bandwidth connection, latency may be unacceptable. A similar problem may occur if the client has little processing resources, and the provision of the service or operation requires high processing capabilities, for example, which are available at the server. In this case delays may also be unacceptable.

On the other hand, it may be advantageous to provide a service or operation on a data file locally at a client, for example, in case a document is edited, as in this case a user input should be displayed at the client without any latency, if possible. However, in case the data file is handled at the server, a user input would be transmitted to the server, then a corresponding change between content would be prepared and transferred back to the client for local visualization, possibly resulting in high latency.

It is therefore, desirable to provide an improved method and system to allow a user to choose between either local or remote processing of a data file in a client and server system.

SUMMARY OF THE INVENTION

Methods and systems consistent with the present invention include an improved method of providing local or remote services in a user-friendly and convenient way, whereby the user is allowed to choose between local or remote processing of a data file in a client and server system. Specifically, the user can specify whether local handling of a data file at a client in providing a service is the best option, or whether the data file should be handled remotely at the server. The ability to choose provides the user flexibility and optimizes the provision of the service or operation at the best location possible, thereby decreasing latency.

The method in a data processing system for local or remote processing of a data file at either a client or a server, includes the steps of providing a selection of either a client program or a server program to perform an operation on the data file at either the client or the server, respectively; selecting either the client program or the server program for performing the operation on the data file at either the client or the server, respectively; and performing the operation on the data file at the selected client or server.

The operation may include at least one of visualizing the data file at the client unit including rendering the data file; editing the data file; and performing either mathematical or logical operations on contents of the data file.

The method may also include retrieving the data file at the client in the event the client program is selected.

The method may also include transmitting information on the selection of the server program to the server, and receiving information on results of the operation, in the event the server program is selected.

The method may also advantageously include the step of detecting whether the client program is available at the client and the server program is available at the server.

The method may also include the step of transmitting to the server an identifier of the server program and control information for controlling the operation, in the event the server program is selected.

The method may also advantageously include the step of switching between the client program and the server program during performance of the operation.

The method may also include the step of providing at least one selection field on a client display unit and receiving a user input corresponding to a selection of either the client program or the server program. The selection field may be part of one of buttons, a menu, a dialog box, and a roll-down window of a user interface at the client.

The method may also include the step of receiving information on a pre-selection of either the client or the server at an arbitrary point in time, wherein the pre-selection is one of the group including a global pre-selection for all data files and operations; a pre-selection for a specific operation; a pre-selection for a specific data file; and a pre-selection for a specific operation in combination with a specific data file.

The client program may also include a first client module and a second client module for a first sub-operation, and the server a program may include a first server module and a second server module for a second sub-operation; wherein the operation includes the first and the second sub-operation; and the method further includes the steps of selecting either the first client module or the first server module to perform the first sub-operation; and selecting either the second client module or the second server module to perform the second sub-operation.

The method may also include either transmitting instructions corresponding to either the first or the second sub-operation on the data file; or receiving instructions corresponding to either the first or the second sub-operation on the data file.

The method for either local or remote processing of a data file at either a client or a server may also include providing a selection of either the client program or the server program to perform an operation on the data file at either the client or the server, respectively, including the steps of selecting the client program for performing the operation on the data file; retrieving the data file at the client; and performing the operation on the data file at the client.

The method for either local or remote processing of a data file at either a client or a server, includes the steps of providing a selection of either the client program or the server program to perform an operation on the data file at either the client or the server, respectively; selecting the server program for performing the operation on the data file; receiving information on the selection of the server program at the server; retrieving the data file at the server and performing the operation on the data file; and transmitting a result of the operation to the client.

Method and systems consistent with the present invention also include a computer readable medium containing instructions that cause a data processing system to perform a method of performing either local or remote handling of a data file at either a client or a server, the method including the steps of providing a selection of either a client program or a server program to perform an operation on the data file at either the client or the server, respectively; selecting either the client program or the server program for performing the operation on the data file at either the client or the server, respectively; and performing the operation on the data file at the selected either client or server.

Methods and systems consistent with the present invention also include a data processing system for performing local or remote processing of a data file at a client or a server t, respectively, the system including a memory containing a program that provides a choice for either a client program or a server program to perform an operation on the data file at either the client or the server, respectively, that selects either the client program or the server program for performing the operation on the data file at either the client or the server, respectively; and that performs the operation on the data file at the selected client or server; and a processor that runs the program.

Methods and systems consistent with the present invention also include an apparatus for performing either local or remote processing of a data file at either the client or the server, the apparatus including means for providing a selection of either the client program or the server program to perform an operation on the data file at either the client or the server, respectively; means for selecting either the client program or the server program for performing the operation on the data file at either the client or the server, respectively; and means for performing the operation on the data file at the selected either client or server.

Methods and systems consistent with the present invention for either local or remote processing of a data file at one of a client and a server, also include the steps of displaying at the client an indication of an operation to be performed on the data file; displaying at the client a selection of either local or remote processing to perform the operation on the data file; and receiving an instruction at either the client or the server that either the local or the remote processing has been selected to perform the operation on the data file.

There has thus been outlined, rather broadly, some features consistent with the present invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENTS

Methods and systems consistent with the present invention provide a user with the flexibility of choosing between local processing of a data file at a client, or choosing remote processing of the data file at the server, in order to find the best option to optimize the provision of service or operation in the data processing system, which results in decreased latency.

An embodiment consistent with the present invention is now discussed with reference to FIG. 1, which depicts a data processing system 00 suitable for practicing methods and systems consistent with the present invention. In a client-server environment, like the one depicted in FIG. 1, a client 10 and server 20 are each connected to a network, such as a Local Area Network, Wide Area Network, or the Internet, over a communication link 40. The steps of the methods and systems consistent with the present invention, are carried out on either the client 10 or the server 20, accessible by the client 10 over, for example, the Internet, using a browser application or the like.

Figure 1:
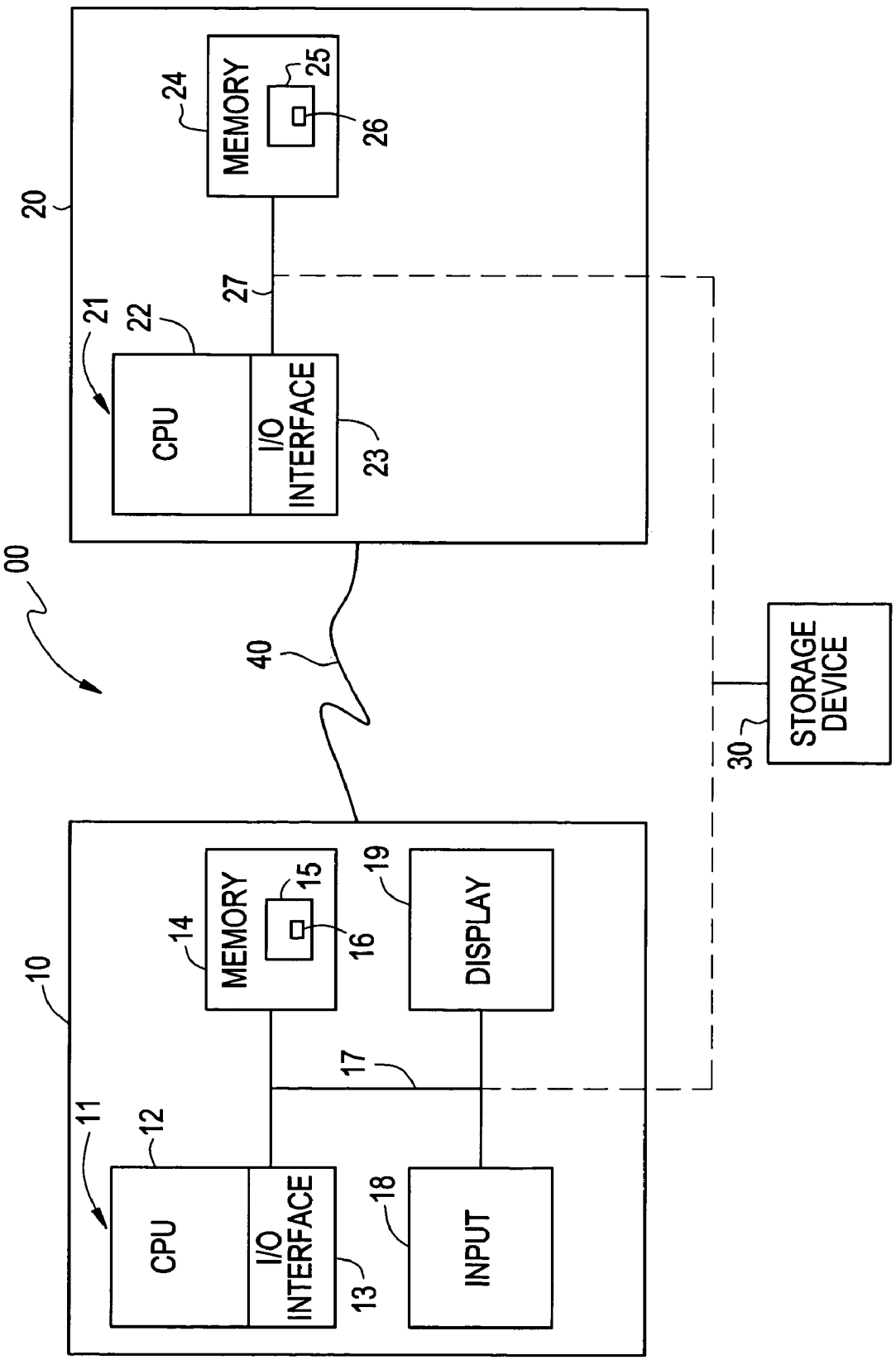
FIG. 1 depicts a data processing system in a client-server configuration suitable for practicing methods and systems consistent with the present invention.

Specifically, the client 10 as shown in FIG. 1, may be a general purpose data processing device, such as a personal computer, a mobile terminal such as a mobile computing device, a mobile phone or a mobile data organizer operated by a user wishing to access a service remote from the client 10 (i.e., at the server 20). Even though only a single client 10 is illustrated in FIG. 1, it is understood that the shown embodiment may include a plurality of similar clients connected to the server 20.

The client 10 of the data processing system 00 may include a processor 11 as a client data processing means, the processor 11 having a central processing unit (CPU) 12 and an input/output (I/O) interface 13, a memory 14 with program 15 (hereafter, "the client program") having a data structure 16, all connected by a bus 17, an input device 18, a display 19, and a secondary storage device 30. The bus 17 may be internal to the client 10 and may include an adapter to a keyboard or input device, or may include external connections.

The client 10 is connected to the server 20 via a communication link 40 as a client communications means, using a communication end port specified by an address or a port, and the communication link 40 may include a mobile communication link, a switched circuit communication link, or as stated previously, may involve a network of data processing devices such as a local area network or a wide area network, like the Internet, or combinations thereof. The communication link 40 may be an adapter unit capable to execute various communication protocols in order to establish and maintain a communication with the server 20. The communication link 40 may be constituted by a specialized piece of hardware or may be realized by a general data processing unit executing corresponding program instructions. It is also possible that the communication link 40 is at least partially included in the processor 11 executing corresponding program instructions.

Specifically, in the client 10, the processor 11 may be internal or external to the client 10, and executes a client program 15 for providing a particular service to a user (i.e., a predetermined operation on a data file). The processor 11 has access to the memory 14 in which is stored at least one sequence of code instructions comprising the program 15 and data structure 16 for performing a predetermined operation on a data file. The memory 14 and program 15 may be located within the client 10 or external thereto.

The program 15 can include a separate program code for performing a desired operation or service, or be part of a module of a larger program providing the service. The program 15 may also include a plurality of modules performing sub-operations of a service.

It is understood that the processor 11 may be adapted to access and/or execute a plurality of programs corresponding to a plurality of services/operations to be performed in connection with at least one data file.

An operation or service rendered by the program 15 may be, for example, the editing of data files, rendering of data files such as web pages, which may correspond to mathematical or logical operations on contents of the data file, i.e., in-home banking applications, spreadsheet applications, drawing applications, e-mail applications and the like. The operation rendered by the program 15 may also relate to visualizing a data file, such as a text document, image file, video data or may relate to playing back audio or audio visual information.

The client 10 may further comprise standard input devices 18 as input means, like a keyboard, a mouse, or a speech processing means (not shown).

The storage device 30 stores at least one data file to be operated on, such as text files, data files, image, audio or video files and the like, in providing a particular service for a user. The data storage device 30 as storage means, may for example, be a database, including a distributed database for example, connected via a network. The storage device 30 may be connected to the server 20 and/or the client 10, either directly or through a communication network, such as a local area network or a wide area network. It is noted that the storage device 30 is optional, as data may also be received via, for example, a network, and directly processed. The program 15 is run from memory 14 in the client 10, as shown in FIG. 1, and as described below.

The server 20 will now be described in further detail.

The server 20 includes a processor 21 having a CPU 22 with I/O interface 23, and a memory 24 with program 25 having a data structure 26, all connected by a bus 27. The processor 21 of the server 20 may be a general purpose data processing unit, but preferably a data processing unit with large resources, i.e., high processing capabilities and a large memory 24 for storing large amounts of data. The bus 27 or similar connection line can also consist of external connections, if the server 20 is constituted by a distributed system.

The server 20 may be a single unit or may be a distributed system of a plurality of servers or data processing units and may be shared by multiple users.

The server 20 includes a processor 21 as a server data processing means which performs at least one server program 25 for a desired operation on a data file, and which is required in serving a request from the client 10. Similar to the client processor 11, the server processor 21 may be constituted by a CPU 22, but may also be constituted by a distributed central processing unit including a plurality of individual processors on one or a plurality of machines. The server processor 21 may have access to a storage device (i.e., storage device 30) for storing preferably a large number of programs 25 for providing various services to users, i.e., for performing various operations on data files as desired by the users operating clients such as the client 10.

The communication link 40 from the server 20 is preferably adapted to communicate with a plurality of clients such as the client 10, i.e., to maintain communication links to a plurality of clients.

As before described with respect to the client 10, a server program 25 may relate to visualizing information such as a text document, image information or video information, or may relate to playing back audio information. Further, the program 25 may relate to editing a data file and to performing mathematical or logical or rendering operations on data files, such as in the process of presenting web pages, in spread sheet applications and the like.

Although aspects of one implementation are depicted as being stored in memory, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing system have been described, one skilled in the art will appreciate that a data processing system suitable for use with methods and systems consistent with the present invention may contain additional or different components.

Methods and systems consistent with the present invention include the concept that a particular operation or service may be performed either at the client 10 or the server 20. Therefore, at each of the client 10 and the server 20 corresponding programs for a desired operation/service are available. Even though such a pair of corresponding programs at the client 10 and the server 20, respectively, perform the same operations from the viewpoint of the user, they may execute slightly different operations internal to the systems. For example, a program 15 for visualizing a data file at the client 10 may include preparing a data file for visualization at a display 19 at the client 10, whereas a program 25 at the server 20 for visualization may include preparing display contents for transfer to the client 10.

Methods and systems consistent with the present invention are carried out by providing a user selection instruction as providing means, which allows reception of a user input in connection with a selection of the client program 15 or the server program 25 for performing the desired operation on the data file.

Figure 10:
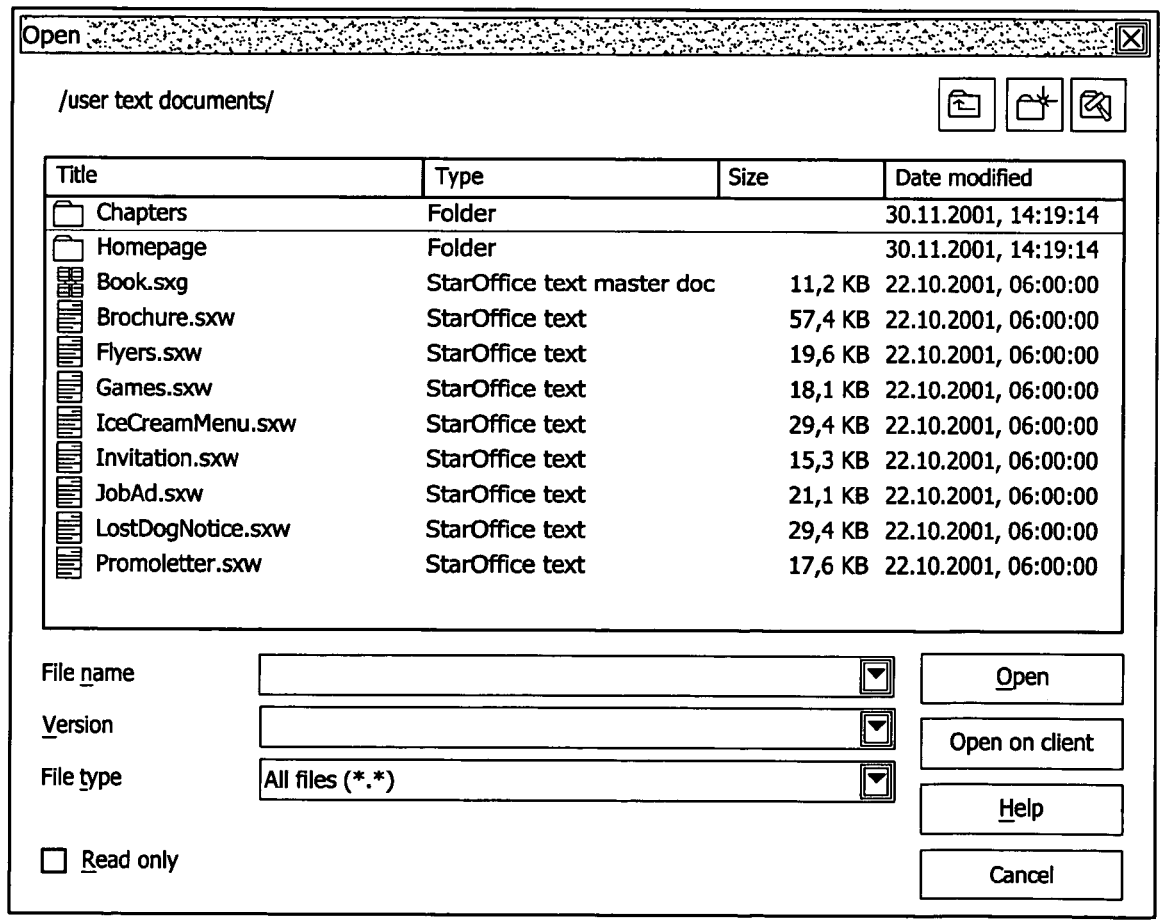
FIG. 10 depicts a screen shot of the selection instructions provided to the client to be performed by the program depicted in FIG. 1, in accordance with methods and systems consistent with the present invention.

For example, the selection instruction or selection means, may be constituted by a selection field displayed on display device 19 of the client 10 (see FIG. 10), for receiving a selection input from a user, indicating a selection of either the client 10 or the server 20 for performing the desired operation. For example, the client selection means may be included as selection buttons, in a menu, dialog box, or a roll-down window of an interface provided at the client 10, and the user may input commands through a keyboard or the like. The selection means may be constituted by a dedicated piece of hardware or its functions may be executed by code instructions executed on the client processor 11, involving for example a display unit 19 for displaying a selection window and a keyboard 18 for entering a selection.

The client program 15 and the server program 25 may provide a desired operation or service on a data file such as editing, rendering, mathematical operations and the like, as performing means. A plurality of client programs 15 and server programs 25 may be provided. A client program 15 and a corresponding server program 25 may provide the same service, i.e., perform the same operation on a data file, at least from the view point of a user operating the client 10. If, for example, the service/operation is editing a data file, both programs 15, 25 will provide the necessary resources to edit the data file, i.e., including visualizing the data file at the client 10. However, processing operations internal to the client 10 and the server 20 may differ. The system shown in FIG. 1 allows a user operating the client 10 to choose between the client 10 and the server 20 for performing a desired operation or service on the data file.

If, for example, a large data file available at the server 20 needs to be handled, it may be advantageous to select the server program 25, i.e. the server 20, for performing the desired operation. In this case, a time consuming transfer of the data file to the client 10 being initiated can be avoided.

If the server program 25 is selected for performing the operation on the data file(s), information on the selection of the server program 25 such as an identifier of the desired operation or the server program 25 is transmitted to the server 20. Further, information on the data file or data files themselves may be transmitted to the server 20. Thus, the server 20 may be instructed to perform the operation on the data file.

The server 20 may retrieve the data file from the storage device 30, for example, or the client 10, perform the operation(s) and may then return information on results of the operation(s) to the client 10, i.e., for local visualization of results at the client 10 or local storage at the client unit.

On the other hand, in case for example, a large number of user interactions are necessary in an operation on a data file, such as in editing the data file, it may be desired to edit the data file at the client 10. This avoids, for example, a frequent transmission of keyboard inputs at the client 10 to the server 20 and a frequent transmission of displaying contents for visualization at the client 10.

Thus, when the client program 15 is selected by the user, the client 10 may retrieve the data file or data files from the storage device 30, for example, and may perform the operation on the retrieved data file, i.e., rendering operations, visualization operations, editing operations, mathematical or logical operations and similar.

It is noted that the above described features and processing operations may realized by dedicated hardware or may be realized as programs including code instructions executed on data processing units. It is further possible that parts of the above sequence of operations is carried out in hardware, whereas other of the above processing operations are carried out using software.

In the following, methods and systems consistent with the present invention will be described with respect to FIG. 2.

Figure 2:
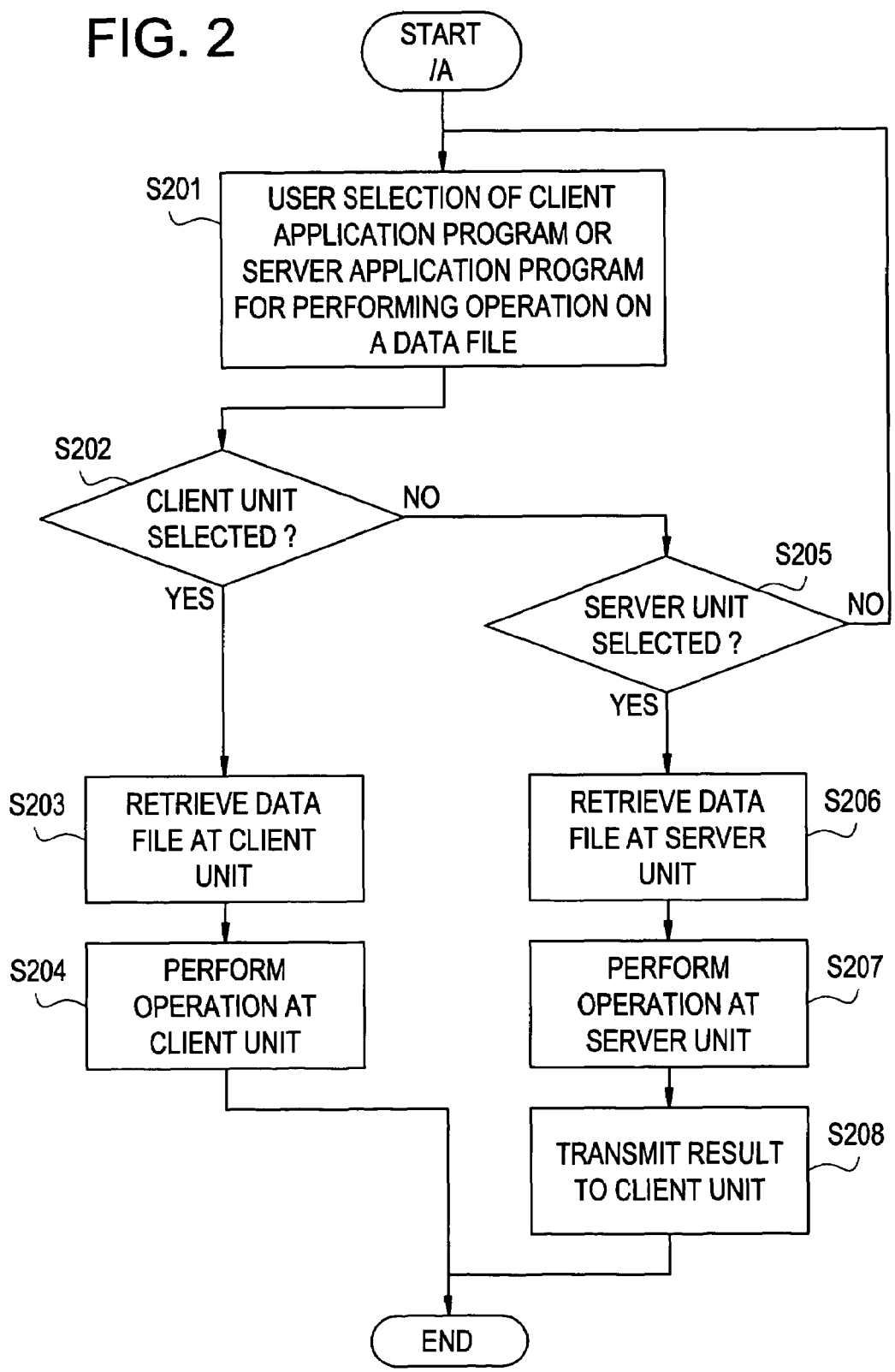
FIG. 2 depicts a flowchart of the steps performed by the program depicted in FIG. 1.

FIG. 2 depicts a flowchart of a sequence of operations of a method for local or remote provision of services according to methods and systems consistent with the present invention, allowing a user operating a client 10 to select one of the client 10 and a server 20 for an operation on a data file, i.e., the user may select one of a client program 15 and a corresponding server program 25 for performing an operation on a data file. The operations illustrated in FIG. 2 may be executed at the system described with respect to FIG. 1, however, FIG. 2 is not limited thereto.

In an operation being performed by a user on a data file, for example when the user is to open one of his working directories on the webtop server, the user is prompted by the program (15 or 25, hereafter "the program") to select a particular operation. In particular, in step S201, the program presents to the user a selection instruction in the form of buttons of "Open" or "Open on client" (see FIG. 10 for screen shot). The button "Open" is the default, and the server 20 will be chosen and the program 25 will perform the desired operation on the data file. However, if the user wishes to edit the document with an installed client component, the user presses "Open on client" and this will transfer the file to the editing component on the client side, i.e., the client 10 shown in FIG. 1, and the program 15 will perform the desired operation on the data file.

Thus, the selection instruction preferably identifies one of the client program 15 and the server program 25 for performing a desired operation on the data file. For example, the user selection could involve selecting the client 10 or the server 20 for rendering a document, for editing a document, for operations prior to a visualization of a document and the like.

The user selection may typically be subsequent to an operation requesting a specific operation on a data file, i.e., at the client 10, for example, by specifying a data file name and an application identifier for specifying the operation to be performed on the data file. This may be achieved by entering a corresponding instruction using a keyboard 18 or by clicking on an icon on a display 19 using a mouse 18 and cursor.

In step S202, the program determines, i.e., at the client 10—whether the client unit 10 is selected for executing the specific operation on the data file, and in case the user selects the client 10, and the decision is "YES", in step S203, the client 10 proceeds to retrieve the data file. Retrieving the data file may include the program loading the data file from a local storage device (i.e., memory 14) to the client processor 11 or may include the program retrieving the data file from the outside, i.e., from the storage device 30 shown in FIG. 1 or from other devices accessible from the client 10, such as another data processing unit or the like.

Subsequently, the specific operation or service is performed at the client 10 in step S204 by the client program 15 selected in the selection step S201. Thereafter the operation ends.

If in step S202 the user selects the server 20, by simply pressing "Open", for example, and decision is "NO", the program determines in step S205, i.e., at the client unit 10—that the server unit 20 is selected for performing the operation, i.e., the server program 25 is selected in the selection step S201.

In the case where in step S205 the decision is "NO", the program returns the operation to step S201, again expecting a user selection.

If in step S205 the user selects the server 20 by pressing "Open", for example, and the decision is "YES", the program retrieves the data file at the server 20 in step S206. Since the step S205 may be performed at the client 10 by the program, prior to step S206, information may be transmitted to the server 20 by the program at the client 10, specifying the server program 25 and preferably specifying the data file to be operated on, instructing the server 20 to retrieve and process the data file. Thus, the program at the client 10 may transmit to the server 20 an identifier of the server program 25 and of the data file, or may transmit the data file itself, if the data file is maintained at the client 10.

Further, the program at the client 10 may transfer control information for controlling execution of the server program 25; however, it is also possible that such control information is transmitted at a later point in time (i.e., step S207 described below).

Step S206 may include the program at the server 20 loading the data file from a local memory 24 accessible by the server 20 or may include retrieving the data file from other components of the system, such as the storage device or database 30 other server units, i.e., connected by a local area network—or may also include retrieving the data file from the client 10.

Subsequently, in step S207 the server program 25 is executed for performing the operation on the data file, as described before. Executing the server program 25 for providing the operation/service may include receiving commands controlling the execution of the application, i.e., receiving commands from the client 10 in an interactive session.

In step S208 any processing result, i.e., information resulting from performing the operation on the data file, may be transmitted to the client 10 by the program at the server 20, i.e., for local storage at the client 10 or for local visualization at the client 10. It is also possible that the processing result is further processed by the program at the client 10. The information transmitted in step S208 may include frames for display at the client 10 or may include information on calculation results or information which needs to be further processed at the client 10 before storage or local visualization. After step S208 the operation ends.

It is noted that even though the server program 25 and the client program 15 may perform essentially the same operation from the viewpoint of the user, the server program 25 and the client program 15 may differ in structure. For example, in case an editing operation is selected, the server program 25 will include receiving editing commands from the client 10 and transmitting editing results back to the client 10 whereas the client program 15 will include local editing functions of a data file.

The embodiment described with respect to FIG. 2 allows a user operating a client 10 to select a server for performing a specific operation over a plurality of specific operations on one or a plurality of data files.

Thus, the user may optimize the performance of the service or operation to be carried out, depending on conditions as outlined previously, by choosing either local or remote processing of a data file.

In the following, an embodiment in accordance with methods and systems consistent with the invention will be described with respect to FIG. 3.

Figure 3:
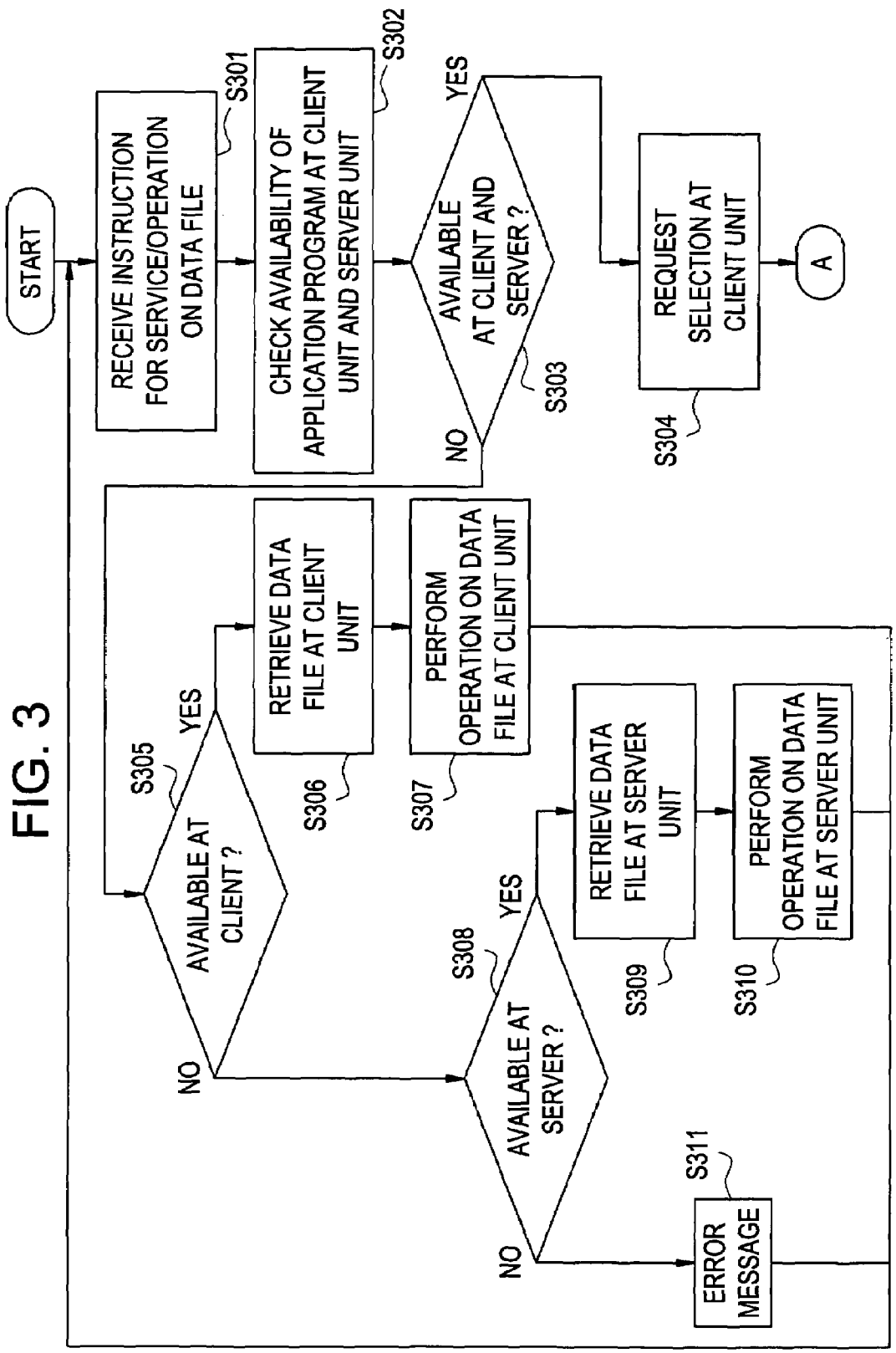
FIG. 3 depicts a flowchart of the steps performed by the program depicted in FIG. 1 according to another embodiment in accordance with methods and systems consistent with the invention.

FIG. 3 illustrates a sequence of steps of a method for providing local or remote service according to another embodiment of the invention. The steps illustrated in FIG. 3 may be performed by the system shown in FIG. 1, however, FIG. 3 is not limited thereto.

Initially, in step S301 the program receives an instruction for a predetermined operation on a data file at the client 10. The instruction could be generated upon a user selection of a data file and a corresponding service such as editing or the like. For example, a data file and a service could be selected by the user clicking once or twice onto an icon representing a data file and a specific connected service on a display 19 at the client 10. For example, a data file could be associated with a specific application, such as an application for displaying or editing the data file, and the data file and the corresponding application, i.e., operation or service, could be selected simultaneously.

However, it is also possible that the data file and the service or operation are selected separately, for example by selection on a display 19 at the client 10 or by input of instructions on a command line using a keyboard 18, by the user.

Subsequently, in step S302, the program checks at the client 10 whether a corresponding client program 15 for performing the selected service or operation is available at the client 10.

Further, the program also determines whether a corresponding server program 25 for performing the selected operation is available at the server 20. This step is optional, if all programs for performing all services or operations are available at the server 20.

Determining the availability of the server program 25 may involve the program initiating a communication between the client 10 and the server 20 for transmitting a corresponding request to the server 20 and returning a notification to the client 10 indicating whether the server program 25 is available or not.

Subsequently, in step S303 the program determines whether the operation can be performed at the client 10 and the server 20, i.e., whether the server program 25 is available at the server 20 and the client program 10 is available at the client 10.

In case in step S303 the program determines that the operation can be performed at either the client 10 or the server 20, and the decision is "YES", in step S304 the user of the client 10 may be requested to select either the client 10 or the server 20 for performing the operation on the data file, i.e., to select the client program 15 or the server program 25. The client selection means may provide at least one selection field on a client display unit 19 for receiving a selection input corresponding to a selection of one of the client program 15 and the server program 25.

The selection field may be buttons "Open" and "Open on client" as described earlier with respect to FIG. 2 (see FIG. 10 for screen shot), or part of a menu of a user interface at the client 10 and the selection may be input via a keyboard 18 or via a selection using a cursor on a display 19 of the client 10. It is also possible that the selection field may be a dialog box, or opened in a roll down menu on an interface for receiving user commands at the client 10.

Further, means may be provided at the client 10 for receiving a pre-selection of either the client 10 or the server 20 for performing all operations on data files or, such a selection could be entered individually for each provided service or operation. The means for pre-selection of the client 10 or server 20 may be performed for example, upon logging onto the system, i.e., in case the user operating the client 10 connects to the server 20, or may be pre-selected at any other point in time including during a time where the client 10 is offline, i.e., not connected to the server unit 20. Thus, if a pre-selection was carried out for one or all services available, step S304 may include determining which pre-selection was carried out by a user (or an operator operating the system) in connection with the requested operation on the data file.

Thereafter the operation may continue at an entry point A shown in FIG. 2, i.e., the operation may proceed to step S201 of FIG. 2.

In case in step S303 the program determines that both the client 10 and the server 20 are not available to run the desired operation, and the decision is "NO", the program determines in step S305 whether the client program 15 is available at the client 10. If the program determines that the decision is "YES", in step S306 the program retrieves the data file at the client 10, i.e., as it was previously outlined with respect to FIG. 2. It is noted that the data file may be retrieved by the program either locally or may be retrieved from any other location including the server 20.

In step S307 the selected client program 15 is executed by the program, and the operation is performed, i.e., under control of a user operating the client 10, as outlined before.

In case in step S305 the program determines that the client 10 is not available to perform the desired operation, and the decision is "NO", in step S308 the program determines whether the server program 15 is available at the server 20 and in case the program determines the answer is "YES", in step S309 the data file is retrieved at the server 20, i.e., as it was outlined with respect to FIG. 2. Thereafter the selected server program 25 is executed for performing the desired operation on the data file at the server 20, as outlined before, which may include receiving control instructions from the client 10.

If in step S308 the program determines that the decision is "NO", indicating that neither the client a program 15 is available at the client 10, nor the server program 25 is available at the server 20, in step S311 an error message is presented to the user, i.e., indicating that the selected operation or service is not available.

After steps S307, S310 and S311, the program returns the operation to step S301, i.e., a next user instruction for the same or another predetermined operation on the same or another data file is expected.

It is noted that some of the steps shown in FIG. 3 are optional, for example steps S308-S311 need not be performed by the program in case it is assumed that the server program 25 for providing a particular operation or service is always available at the server 20.

In the following a further embodiment in accordance with methods and systems consistent with the invention will be described with respect to FIGS. 4A and 4B.

Figure 4A:
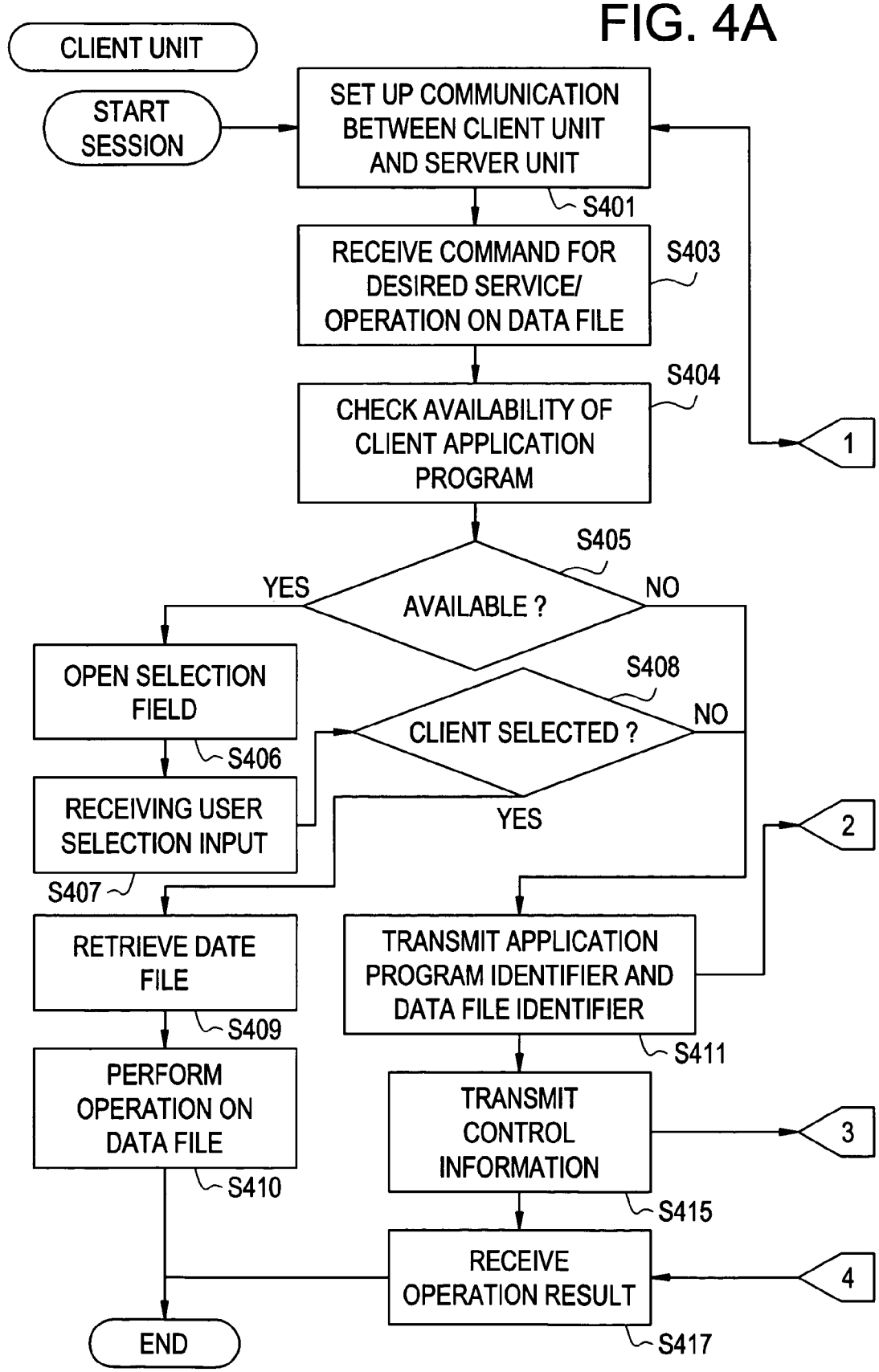
FIGS. 4A and 4B depict flowcharts of the steps performed by the program depicted in FIG. 1 according to another embodiment in accordance with methods and systems consistent with the invention.
Figure 4B:
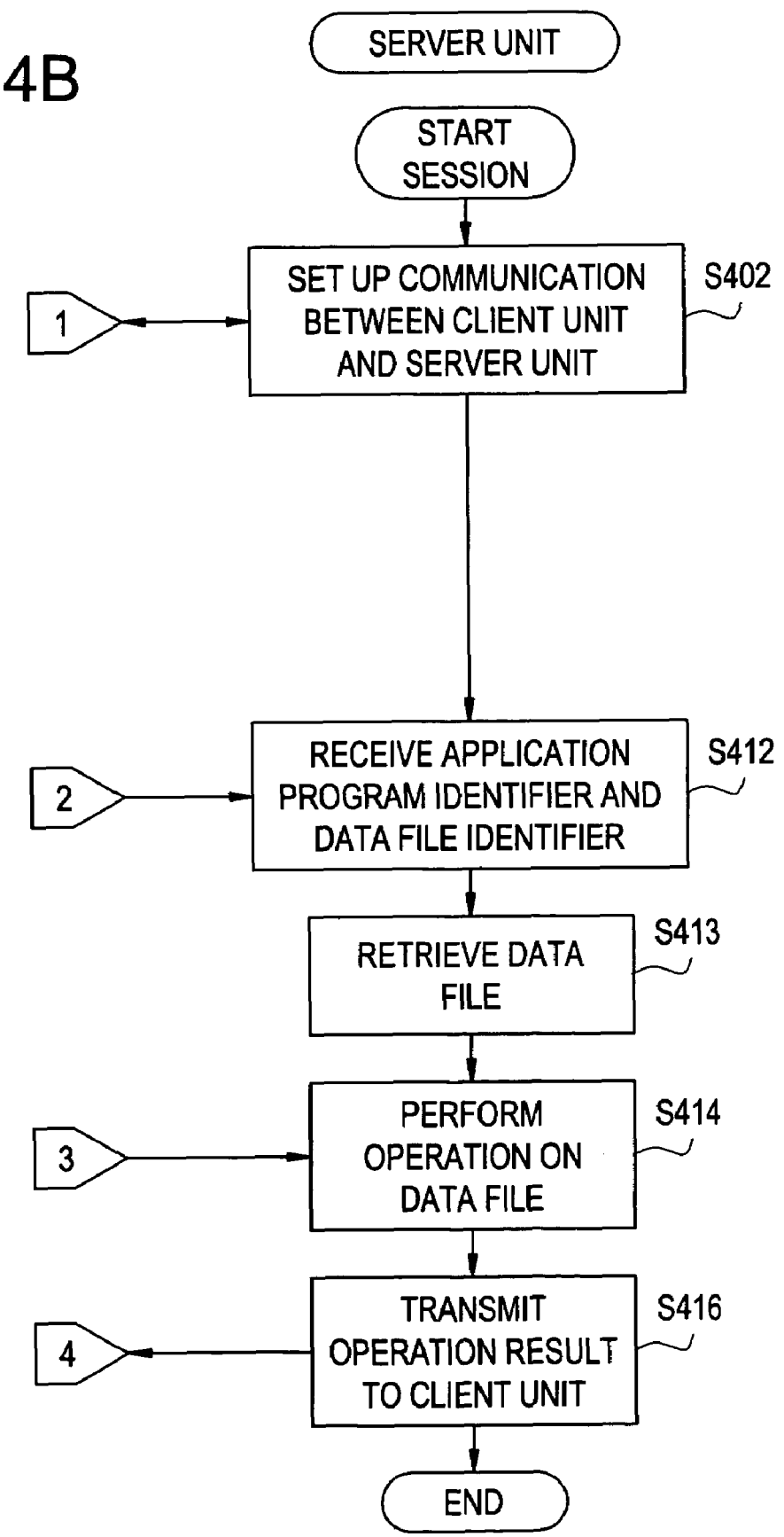

FIGS. 4A and 4B illustrate steps of a method for providing local or remote service in a client and server system according to another embodiment of the invention. FIG. 4A particularly illustrates steps performed at the client 10 and FIG. 4B illustrates steps performed at the server 20, including communications between the units 10, 20. The steps illustrated in FIGS. 4A and 4B may be performed by the system shown in FIG. 1, however, FIGS. 4A and 4B are not limited thereto.

FIG. 4A illustrates on the left side, steps performed at the client 10 and FIG. 4B illustrates on the right side, steps performed at the server 20 in providing local or remote service to a user.

In steps S401 and S402, starting an access session, the program establishes a communication between the client 10 and the server 20. This may involve logging onto the server 20 from the client 10 using known techniques, i.e., involving a dedicated communication link 40 or a network such as the Internet.

Then, in step S403 at the client 10, the program receives a command from the user for service, i.e., a command instructing a specific operation on a data file, i.e. similar to step S301 outlined with respect to FIG. 3.

In step S404, the program determines whether the client program 15 is available at the client 10, for example, as outlined before with respect to FIG. 3.

In step S405 the program determines whether the client program 15 is available at the client 10 and if the decision is "YES", in step S406, the program presents a selection field to the user and a selection input by the user may be received by the program in step S407 as outlined for example, with respect to step S304 of FIG. 3.

Thereafter, the program determines in step S408 whether the client 10 is selected. In case the decision in step S408 is "YES", in step S409 the program retrieves the data file at the client 10, for example, as outlined previously. Subsequently, in step S410 the client program 15 executes the desired operation on the data file, i.e., as outlined previously. Thereafter the operation ends.

If in step S408 the decision is "NO", in step S411, the program transmits information on the requested operation or service and on the selected data file to the server 20. This may involve the program transmitting a program identifier and an identifier of the data file through the communication link 40 between the client 10 and server 20 set up in steps S401 and S402. It may also involve transmitting at least parts of the data file to the server 20.

In step S412 at the server 20, the program receives the information of step S411 instructing the server 20 to perform the operation on the data file.

In step S413 at the server 20, the program retrieves the data file, for example, as outlined previously, and in step S414 the server program 25 executes the desired operation or service on the data file. This may include the program receiving control information for controlling the operation from the client 10, as illustrated by an optional step S415.

Finally, in step S416, a result of the operation may be transmitted back to the client 10 for local visualization at the client 10 in step S417, as for example outlined previously.

It is noted that the above steps may at least partially be performed in hardware or software.

In the following, methods and systems consistent with a further embodiment of the present invention will be described with respect to FIG. 5.

Figure 5:
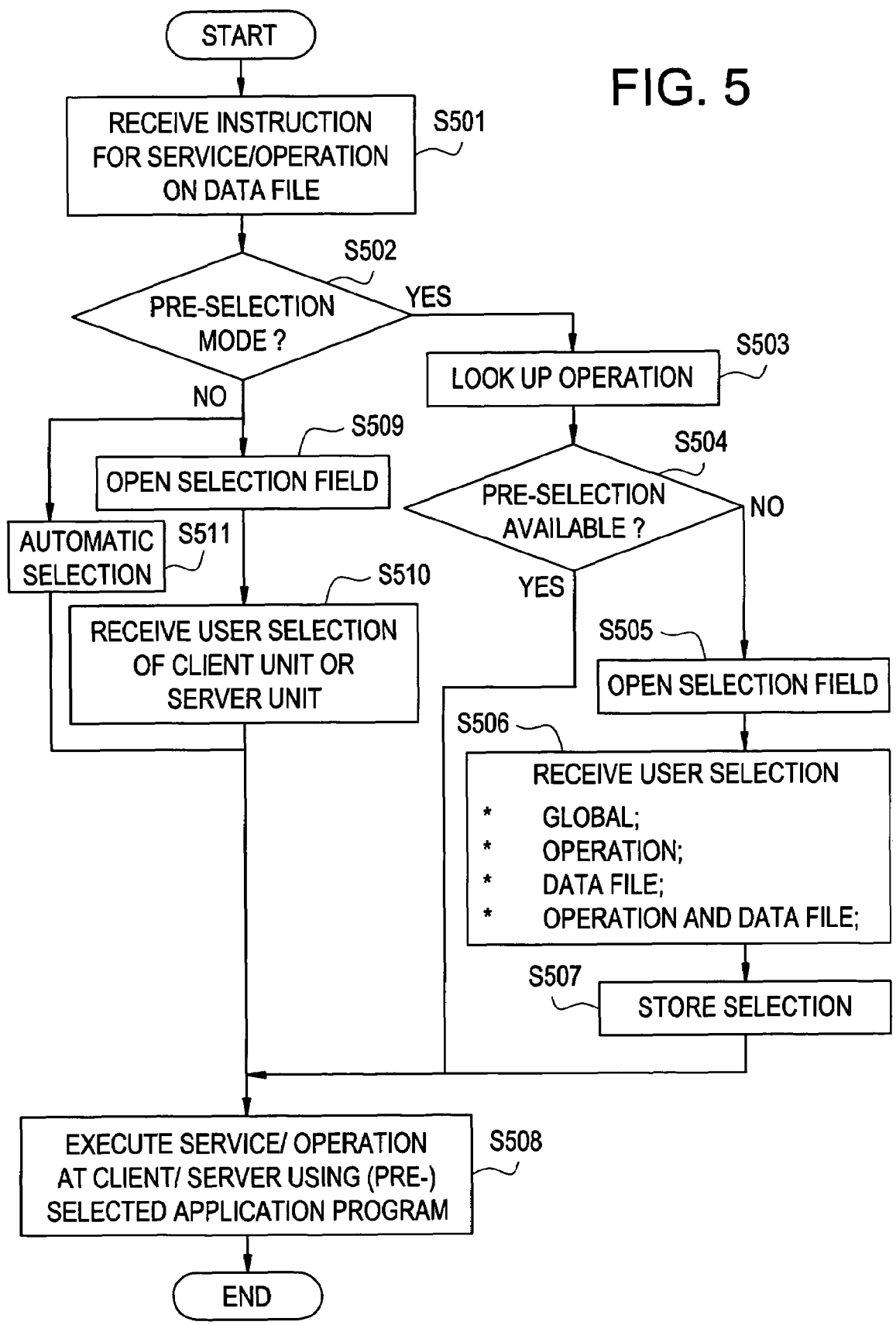
FIG. 5 depicts a flowchart of the steps performed by the program depicted in FIG. 1 according to another embodiment in accordance with methods and systems consistent with the invention.

FIG. 5 shows a sequence of steps of the method for providing local or remote service according to another embodiment consistent with the present invention, particularly including options for a pre-selection of one of the client 10 and the server 20 for performing an operation on a data file. The steps illustrated in FIG. 5 may be executed by the system shown in FIG. 1, however, FIG. 5 is not limited thereto.

In a first step S501, the program receives an instruction for a service or operation on a data file, preferably at the client, such as the client 10 of FIG. 1. Step S501 may be similar to step S301 described with respect to FIG. 3. At this point it is assumed that a communication link 40 between the client 10 and a server 20 was already established and further, it is assumed that a client program 15 for performing the desired operation is available at the client 10, and further it is assumed that a server program 25 for performing the desired operation is available at the server 20.

In an operation S502, the program determines whether a pre-selection mode is set, for example at the client 10, indicating a user preference for local service or remote service, i.e., for performing the operation on the data file at the client 10 or at the server 20. The pre-selection mode may also be set by other entities of the system such as the server 20.

If in step S502 the program determines the decision is "YES", in step S503 a lookup operation is performed, for example at the client 10, in order to determine whether a pre-selection of the client 10 or the server 20 for the desired operation on the data file has previously been set, for example in a memory 14 accessible by the client 10. The lookup operation performed by the program may include transferring information on the operation and/or the data file to a remotely executed process to determine whether in a memory 14, 24 a pre-selection in correspondence to the transmitted information is available. Pre-selection information may be maintained at the client 10, at the server 20 or any other location.

In step S504 the program determines whether a pre-selection of the client 10 or server 20 is available, i.e., whether the user has pre-selected the server program 25 or the client program 15 for performing the desired operation on the data file. If in step S504 the program determines that the decision is "NO", in step S505, the program presents a selection field to a user at the client 10, for example as outlined with respect to previous embodiments. However, it is also possible that the program prompts the user by other means to input a selection instruction.

In an operation S506 a user selection is received, indicating a selection of the server application program 25 at the server unit 20 or the client application program 15 at the client unit 10 for performing the desired operation on the data file.

In step S506 the program may allow the user to choose between a plurality of different pre-selection options reflecting user preferences as to how a pre-selection should be handled. The program may handle the pre-selection globally, in connection with an operation or service, in connection with a particular data file, or in connection with a data file associated with an operation.

Specifically, as a first option, the program will handle the pre-selection globally, i.e., the user may select the client 10 or server 20 for all operations carried out, i.e., during a session, provided that for an operation a server program 25 and a client program 15 are available. According to the first option, any operation will be carried out by the program at the unit specified in the global pre-selection.

As a second option, the user may specify a pre-selection depending on a specific operation or service, i.e., may pre-select the client 10 or server 20 for carrying out a corresponding client program 15 or server program 20. Thus, according to the second option, a corresponding operation or service will on any specified data file be carried out at the client 10 or server 20 by the program. The second pre-selection option may be advantageous for example, in situations where a specific operation usually has improved performance characteristics at the client 10 or server 20. In this case, a corresponding pre-selection of the client 10 or server 20 may improve for example, latency. For example, an operation corresponding to editing a document may advantageously be carried out locally at the client 10, whereas an operation such as rendering a web page or video data may be advantageously carried out at the server 20, due to higher processing resources.

According to a third option, the user may specify a pre-selection in connection with the selected specific data file, i.e., may pre-select the client 10 or server 20 for performing any operation on the data file. This option may for example, be advantageous if the data file is locally available at the client 10 or stored at the server 20. A pre-selection may also be specified for groups of data files, such as for all text documents, image files etc., or subgroups thereof.

As a fourth option, the user may specify a pre-selection in connection with the desired operation and the selected data file, indicating that the client 10 or the server 20 is to be selected in case a specific operation is performed on a specific data file.

The pre-selections according to the first to fourth options may be stored in a memory 14, 24, or 30 either, as outlined above, during operation, or may be stored in a memory at another arbitrary point in time, including times where the client 10 is offline, i.e., not connected to the server 20.

Storing the pre-selection information is performed in step S507. The pre-selection information may be stored in a memory 14 at the client 10, in a memory 24 at the server 20 or at any other location (i.e., storage device 30), for example, in a network of data processing devices, and the pre-selections may be retrieved as outlined in step S503 from the respective storage location.

Thereafter in step S508, the program executes the operation or service on the data file according to the specified selection, i.e., at the client 10 or server 20 using the respective program 15, 25, for example as outlined with respect to previous embodiments.

If in step S504 the program determines the decision is "YES", i.e., a pre-selection is available for the operation on the data file, the program directly proceeds the operation to step S508 and the operation is performed at the pre-selected location, i.e., at the client 10 or server 20 using the respective program 15, 25.

If in step S502, the program determines the decision is "NO", i.e., the pre-selection mode is not set, then in step S509 the program presents a selection field to the user, i.e., on a client display unit 18 as outlined previously with respect to previous embodiments. However, it is noted that the program may prompt the user to input a selection by any other means, including using audio information.

Thereafter, in step S510 the program receives a user selection of the client 10 or the server 20, i.e., the user selects either the client 10 or server 20 for performing the operation on the data file. Step S510 may be similar to the previous embodiments.

Thereafter the program continues the operation to step S508 and the operation is performed according to the selection, i.e., at the client 10 or server 20.

Alternatively to steps S509 and S510, the program may provide an automatic selection of the client 10 or server 20, as indicated by an operation S511. In step S511, the program may provide either the client 10 or the server 20 to be automatically selected for performing the desired operation on the data file. The automatic selection may follow certain parameters including at least a file size of the data file, a type of operation, performance characteristics of a communication link 40 between the client 10 and the server 20, and processing and/or storage resources at the client 10.

For example, a selection of the server 20 may be advantageous for a large data file, whereas for an operation or service requiring frequent user interaction and little processing capabilities, a selection of the client 10 may be advantageous.

After optional step S511, the program continues the operation with step S508 and the service is performed by the program according to the selection. After step S508 the program ends the operation or may return to step S501 for further operations.

The embodiment described with respect to FIG. 5 provides enhanced user flexibility in configuring an access session to a server by specifying pre-selection options of step S506 and by specifying the pre-selection mode. Further, increased convenience may be achieved by selecting an automatic selection of either the client 10 or the server 20 as indicated by step S511.

In the following, methods and systems consistent with a further embodiment of the present invention is described with respect to FIG. 6.

Figure 6:
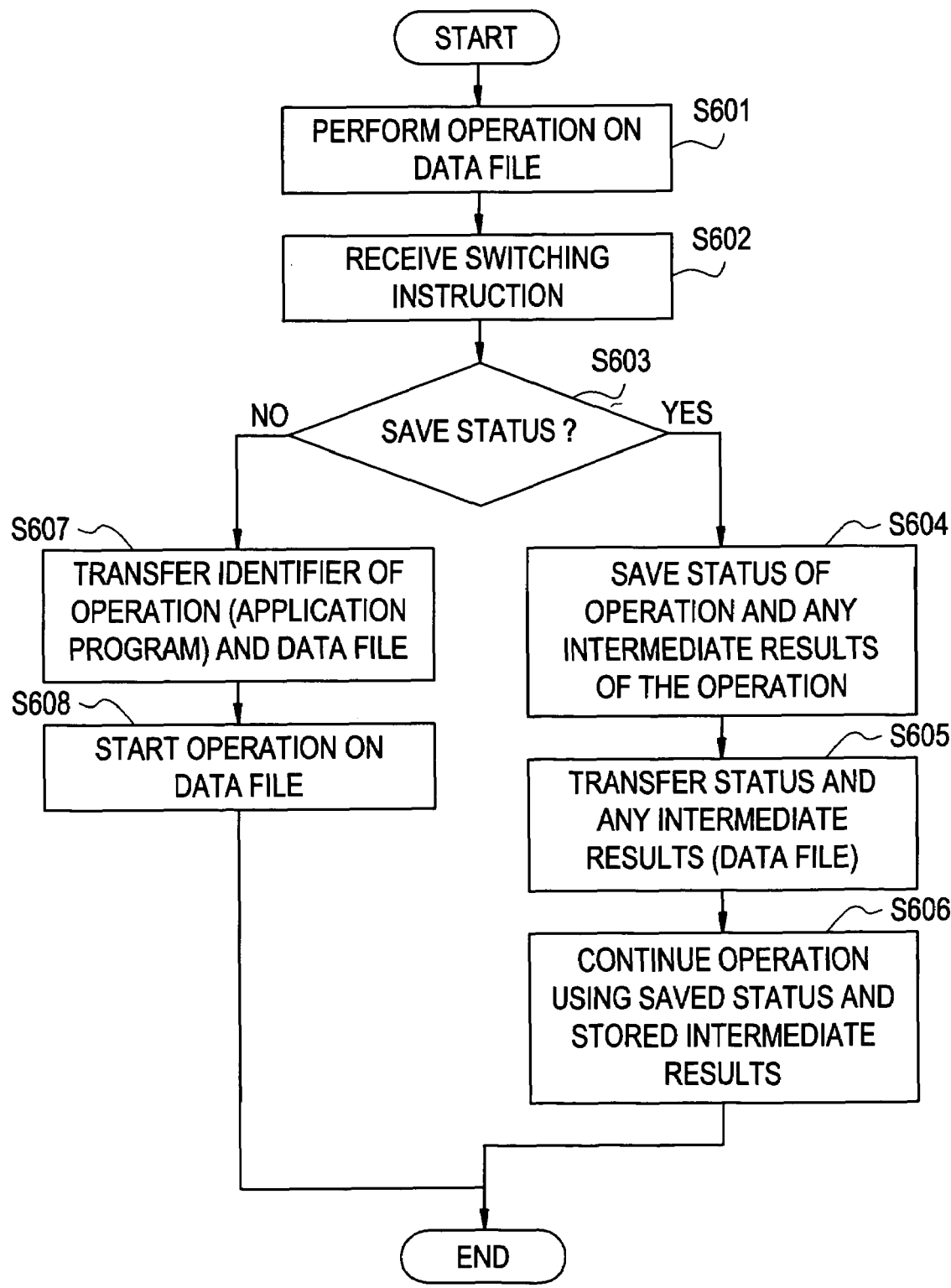
FIG. 6 depicts a flowchart of the steps performed by the program depicted in FIG. 1 according to another embodiment in accordance with methods and systems consistent with the invention.

FIG. 6 shows a sequence of steps performed in the method according to another embodiment consistent with the invention. FIG. 6 particularly illustrates steps performed during switching the location of execution of the operation by the program, i.e., switching between the client 10 and the server 20 during performing the operation. The steps of the present embodiment may be performed by the system shown in FIG. 1, however, FIG. 6 is not limited thereto.

In step S601 the desired operation, i.e., the desired service, is performed by the program on the data file, as it was outlined with respect to previous embodiments. The operation may either be performed at the client 10 or the server 20.

In step S602 a switching instruction is received by the program, preferably at the client 10, instructing the program to switch the location of the execution of the operation from the client 10 to the server 20 or vice versa. Corresponding information notifying the respective other unit of the switching instruction may be transmitted between the client 10 and the server 20. The switching instruction may be input by a user, for example, if an execution of the operation on the respective other unit appears advantageous.

However, it is also possible that the switching instruction is generated by the client 10 or server 20 upon determining that an execution of the operation on the respective other unit is advantageous, i.e., if it is determined that resources at the client 10 are insufficient or if delays in connection with a transmission of information during an execution of the operation at the server 20 are above a certain threshold.

Preferably, upon receiving a switching instruction the program interrupts execution of the operation. Then, in step S603 the program may request that the user indicate whether the present status of the operation should be saved. If in step S603 the user instruction is "YES", in step S604, the status of the operation and/or any intermediate results of the operation may be stored, i.e., at the client 10 or the server 20 or in external storage means such as the storage device 30 shown in FIG. 1. Saving the status may include saving the exact conditions under which the operation was interrupted. Storing intermediate results of the operation may include intermediate calculation results or may include storing a modified version of the data file, modified during performance of the operation before the switching instruction was received.

It is noted that the decision on storing may be also reached by the program at the client 10 or server 20 without user action, i.e., upon determining that a reduced delay may be achieved with storing and discarding a status of the operation.

Thereafter, in step S605, the status and possibly any intermediate results, i.e., the modified data file, are transmitted by the program between the units, i.e., from the client 10 to the server 20 or vice versa.

In step S606, the operation is then continued at the respective other unit using the saved status and the stored intermediate results, i.e., the modified data file.

If in step S603 the program determines that the decision is "NO" to save the status of the operation, in step S607 the status and any intermediate results obtained during performance of the operation prior to receiving the switching instruction may be discarded by the program and an identifier of the operation, i.e., the program, and if necessary, the data file, may be transmitted by the program to the respective other unit, similar to what was outlined with respect to previous embodiments.

Subsequently, in step S608, the program will newly start the operation on the data file, without referring to any intermediate results of the operation achieved before receiving the switching instruction.

After steps 5608 and S606 the program ends the operation.

The described embodiment advantageously allows switching between the client 10 and the server 20 during performance of the operation, i.e., during provision of a particular service to the user. For example, in case the selected service is editing a document at the server 20 and the latency is unacceptably high, by using the switching instruction, the editing of the data file could be transferred from the server 20 to the client 10 by the program in order to achieve reduced latency.

It is noted that repeated switching between the client 10 and the server 20 is possible.

In the following, methods and systems consistent with a further embodiment of the present invention will be described with respect to FIG. 7.

Figure 7:
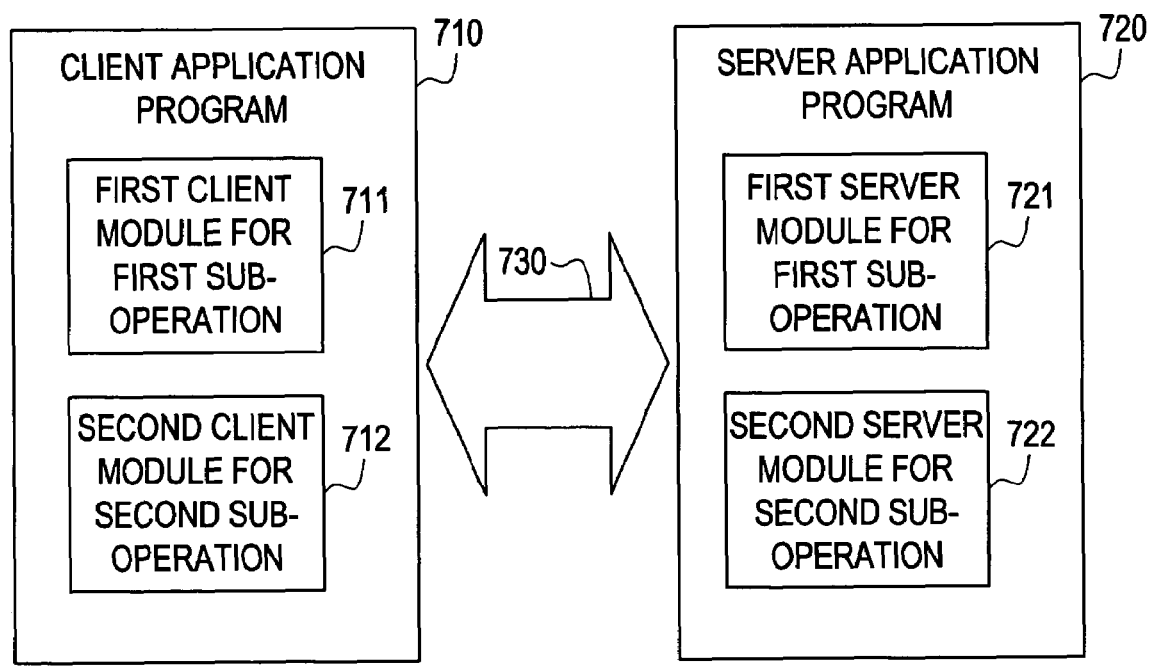
FIG. 7 depicts a data processing system in a client-server configuration suitable for practicing methods and systems consistent with another embodiment in accordance with methods and systems consistent with the present invention.

FIG. 7 depicts a client program 710 including a first client sub-component or module 711 for a first sub-operation and a second client sub-component or module 712 for a second sub-operation. A server program 720 includes a first server sub-component or module 721 for the first sub-operation and a second server sub-component or module 722 for the second sub-operation. A double arrow 730 illustrates a communication path through which the client 10 and the server 20 including client program 710 and the server program 720, may communicate.

According to the embodiment of FIG. 7 which is consistent with the present invention, the client program 710 and server program 720 for performing the desired operation on a data file may be subdivided into at least one first and second module for performing at least a first and second sub-operation.

A client module may be a sequence of code instructions which may for example, be executed at the client processor 11 or server processor 21 shown in FIG. 1.

The first sub-operation and the second sub-operation together may make up the desired operation on the data file, for example preparing a data file for visualization, editing a data file or performing rendering or mathematical or logical operations on the data file.

For example, a sub-operation in editing a document could include operations for visualizing information and a second sub-operation could include a receiving of a user input for editing the data file.

In the case of a mathematical operation, a first sub-operation could include a set of mathematical instructions and a second sub-operation could include visualizing a result of the first sub-operation.

The sub-operations may be performed by the modules, dividing a desired operation or service, i.e., a program, into smaller logical entities.

The embodiment consistent with the present invention allows a free selection of the client 10 and the server 20 for performing the first sub-operation and the second sub-operation. Therefore, while the first sub-operation may be executed at the client 10, the second sub-operation may be executed at the server 20 and vice versa. Of course, it is also possible that both sub-operations are executed at either the client 10 or the server 20.

For example, if the desired operation or service includes a spread sheet application, a first module could include preparing the data file for display including performing the mathematical operations of the spread sheet, whereas a second module could include functions for receiving a user input to be processed. Therefore, while the first module for the first sub-operation, potentially requiring large computational requirements, may be performed at a server 20, the client 10 may be selected for the second module for the second sub-operation relating to receiving user input at selected locations of the spread sheet application. Accordingly, while a data file could be maintained at the server 20, a smaller part of the data file for editing, i.e., the part for receiving a user input, could be transmitted to the client 10.

Allowing a user to select the location of execution of modules of an application program for providing a specific service allows further improvement of the performance of the system for providing remote or local service.

In the following a further embodiment consistent with the present invention will be described with respect to FIG. 8.

Figure 8:
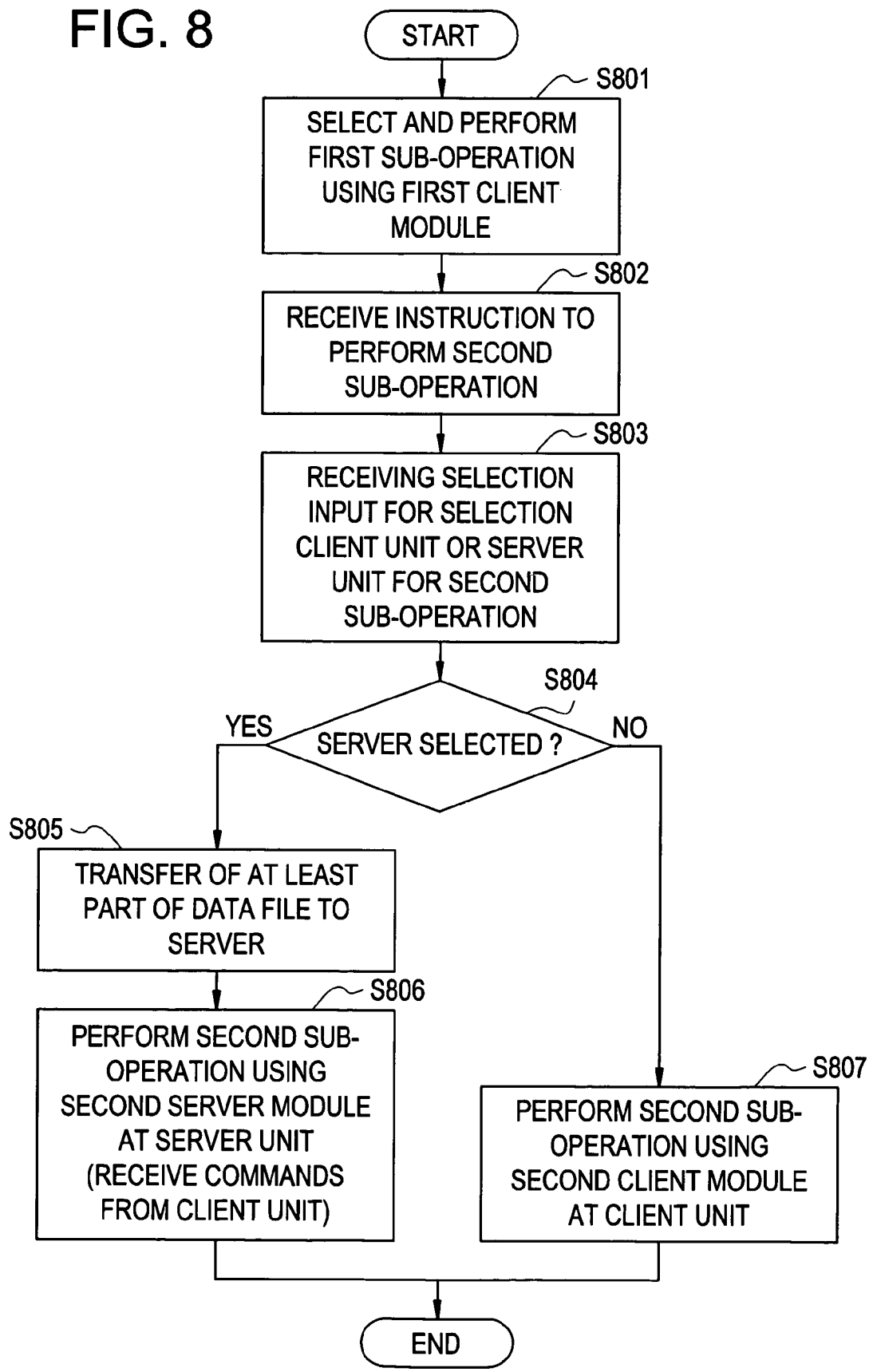
FIG. 8 depicts a flowchart of the steps performed by the program depicted in FIG. 7.

FIG. 8 shows a sequence of operations of a method for providing remote or local service with a first and second module according to another embodiment consistent with the present invention. The operations illustrated in FIG. 8 may be performed by the system shown in FIG. 1, the system of FIG. 1 including the client program 710 and the server program 720 described with respect to FIG. 7. However, FIG. 8 is not limited thereto.

In the present embodiment, for simplicity reasons, it is assumed that the first sub-operation is performed at the client 10 using the first client module 711.

In a first step S801, the program performs a selected first sub-operation using a first client module 711. The selection of step S801 may be performed similarly to the selection of the steps for providing an "entire" operation, described with respect to previous embodiments.

In step S802 an instruction for the second sub-operation is received by the program. This instruction may be input by a user at the client 10, or may be generated during execution of the first sub-operation with the first client module 711.

For example, in case the desired operation on the data file includes a spread sheet application, the first sub-operation could include visualizing the data file locally at the user/client, and the second sub-operation could relate to performing a complex mathematical operation on contents of the data file, i.e., in correspondence to a user input during performing the spread sheet application.

In step S803, a selection input for selection of the client 10 or server 20 for the second sub-operation using the second client or server module is received by the program. Step S803 may be similar to the previous embodiments, particularly, the selection step may include a selection as described with respect to FIG. 6, including an automatic selection in accordance with the parameters described.

In step S804, the program determines whether the server 20 is selected for performing the second sub-operation and if the decision is "YES", in step S805, at least part of the data file is transferred to the server 20 by the program. This part preferably is only the part of the data file needed for performing the second sub-operation. Further, in step S805, the program transmits an identifier of the second server module 722 to the server 20. It is also possible that the entire data file is copied to the server 20.

Thereafter, the program performs the second sub-operation using the second server module 722 at the server 20—for example, a mathematical operation may be performed as outlined before. The program execution of the second sub-operation at the server 20 may include receiving commands concerning the execution of the second sub-operation at the server 20.

Optionally, after completion of step S806, the program may continue the first sub-operation, or the first sub-operation and the second sub-operation may be executed by the program in parallel at the server 20 and client 10.

In case in step S804 the program determines the decision is "NO", i.e., the client 10 is selected, in step S807, the second sub-operation using the second client module 712 is performed at the client 10, as outlined before. Thereafter the program ends the operation.

Even though it is assumed in the present embodiment that the first sub-operation is executed by the program at the client 10, in another embodiment it is equally possible for the program to perform the first sub-operation at the server 20. In this case, in steps S801-S807, "server" is to be replaced by "client" and vice versa.

In the following a further embodiment consistent with the present invention will be described with respect to FIG. 9.

Figure 9:
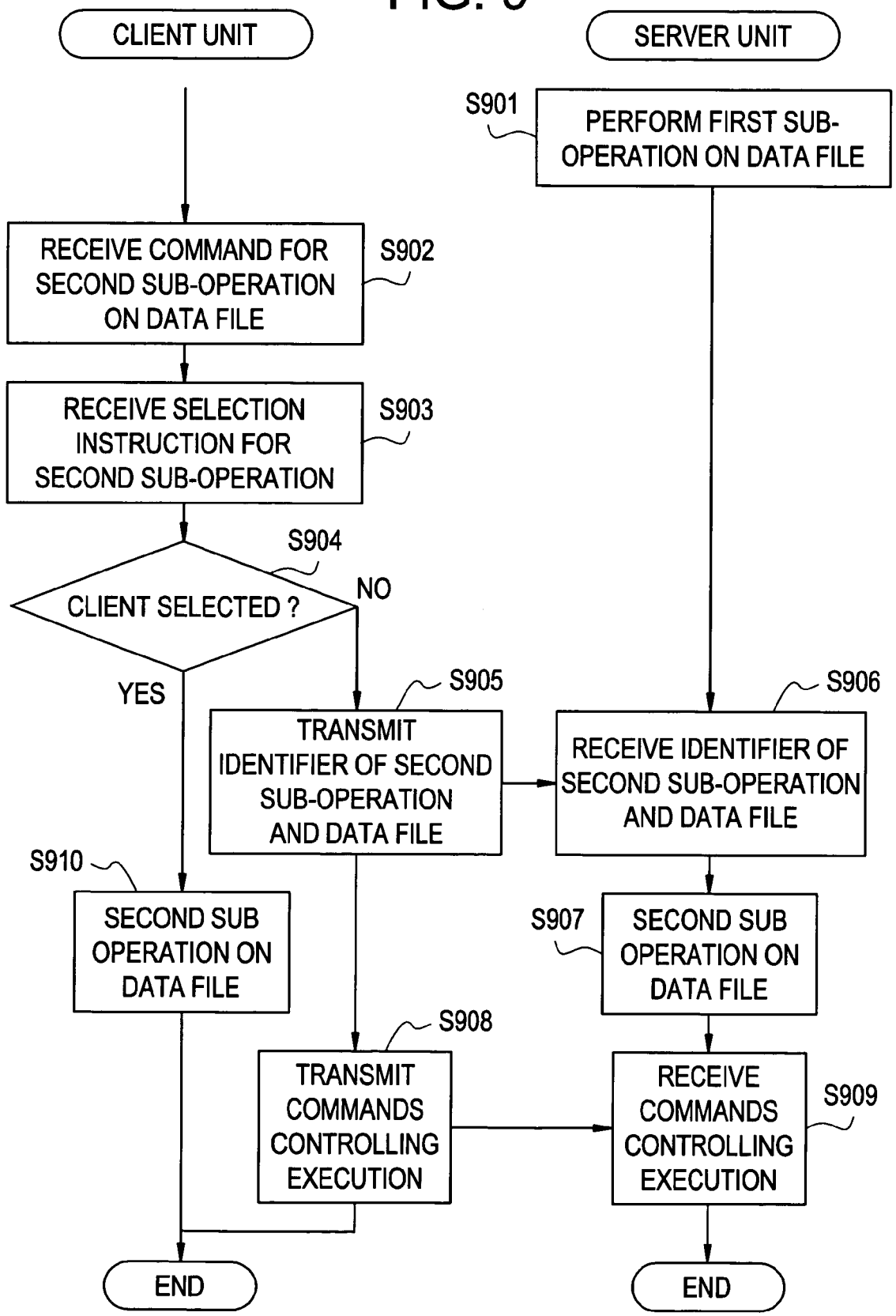
FIG. 9 depicts a flowchart of the steps performed by the program depicted in FIG. 7 according to another embodiment in accordance with methods and systems consistent with the present invention.

FIG. 9 shows a sequence of steps in providing local or remote service performed at the client 10 and the server 20. The left side of FIG. 9 shows steps at the client 10 and the right side of FIG. 8 illustrates steps at the server 20.

In the embodiment of FIG. 9, for simplicity reasons, it is initially assumed that the first sub-operation on the data file is performed by the program at the server 20 in step S901. The first sub-operation may be selected, and performed by the program, as outlined with respect to previous embodiments, particularly the embodiment of FIG. 7.

Then, at the client 10 in step S902, a command for the second sub-operation on the data file is received by the program, either inputted by a user or generated by the first sub-operation, i.e., as it was outlined with respect to FIG. 8.

In step S903, a selection instruction for the second sub-operation is input to the client 10, i.e., as it was outlined with respect to step S803 above.

In step S904, the program determines whether the client 10 is selected and in case the decision is "NO", i.e., the server 20 is selected, the program transmits an identifier of the second sub-operation to the server 20. Further, in step S905 at least part of the data file may be transmitted to the server 20 by the program, unless i.e., the data file is also available at the server 20.

In step S906 at the server 20, the identifier and at least part of the data file are received by the program and in step S907, the second sub-operation is performed by the program. This may include receiving commands controlling the execution of the second sub-operation in step S909, transmitted by the program from the client 10 in step S908. The commands may input by a user.

If in step S904 the program determines that the decision is "YES", indicating that the client 10 is selected, in step S810, the second sub-operation is executed by the program on the data file at the client 10, i.e., as it was outlined previously.

Even though it is assumed in the present embodiment that the first sub-operation is executed by the program at the server 20, in another embodiment it is equally possible for the program to perform the first sub-operation at the client 10. In this case, in step S909 receiving commands controlling the execution of the second sub-operation, transmitted by the program from the client 10 in step S908, may include commands input by a user or generated by the first client module.

While specific sequences of operations were described in connection with the above embodiments, it is noted that the above outlined sequences of operations may be varied.

Further, the features and processing steps of the above described embodiments may realized by dedicated hardware or may be realized as programs including code instructions executed on data processing units. It is further possible that parts of the above processing steps are carried out in hardware, whereas other processing steps of the above steps are carried out using software.

It is further noted that a computer readable medium may be provided, having a program recorded thereon, where the program is to make a computer or system of data processing devices execute functions of the above described steps of the individual embodiments, particularly of the client unit and/or the server unit. A computer readable medium can be a magnetic or optical or other tangible medium on which a program is recorded, but can also be a signal, e.g., analog or digital, electromagnetic or optical, in which the program is embodied for transmission.

Further, a computer program product may be provided comprising the computer readable medium.

According to another embodiment consistent with the present invention, a client 10 for local or remote processing of a data file in a client and server system includes a code section containing instructions for a client program 15 for an operation on the data file; a code section containing instructions to communicate with a server 20, the server 20 including a code section containing instructions of a server program 25 for the operation on the data file; and a code section containing instructions to select one of the client program 15 and the server program 25 for performing the operation on the data file.

The client 10 includes a code section containing instructions to detect whether the client program 15 is available at the client 10 and the server program 25 is available at the server 20.

The client 10 also includes a code section containing instructions to transmit to the server 20 an identifier of the server program 25 and control information for controlling the operation, and to receive a result of the operation from the server 20, in case the server program 25 is selected.

The client 10 also includes at least one of a code section containing instructions to retrieve the data file, in case the client program 15 is selected; and a code section containing instructions to effect transmission of the data file to the server 20, in case the server program 25 is selected.

The client 10 includes a code section containing instructions to receive an instruction to switch between the client program 15 and the server program 25 during performance of the operation.

The client 10 includes a code section containing instructions to provide at least one selection field on a client display unit 19 and to receive a user input corresponding to a selection of one of the client program 15 and the server program 25.

The client 10 also includes a code section containing instructions to receive a pre-selection instruction of one of the client 10 or server 20 at an arbitrary point in time, and wherein the pre-selection is one of the group including a global pre-selection for all data files and operations; a pre-selection for a specific operation; a pre-selection for a specific data file; and a pre-selection for a specific operation in combination with a specific data file.

At least one selection field is part of a menu of a user interface at the client 10.

The client program 15 includes a first client module and a second client module for a first sub-operation; the server program 25 includes a first server module and a second server module for a second sub-operation; wherein the operation includes the first and second sub-operation; and includes a code section containing instructions to select one of the first client module and the first server module to perform the first sub-operation; and one of the second client module the second server module to perform the second sub-operation.

The client 10 includes a code section containing instructions to at least one of transmit and receive instructions corresponding to the execution of the first or second module.

According to another embodiment consistent with the present invention, a server 20 for local or remote processing of a data file in a client and server system, adapted to cooperate with the client 10 as described above, includes a code section containing instructions to execute a server program 25 for an operation on the data file; a code section containing instructions to communicate with the client 10, the client 10 including a client program 15 for performing an operation on the data file and to transmit a result of the operation to the client 10; and a code section containing instructions to receive from the client 10 information on a selection of the server program 25 for performing the operation and to transmit a result of the operation to the client 10.

The server 20 includes a code section containing instructions to receive from the client 10 an identifier of the server program 25 and control information for controlling the operation, in case the server program 25 is selected.

The server 20 includes at least one of a code section containing instructions to retrieve the data file, in case the server program 25 is selected; and a code section containing instructions to effect transmission of the data file to the client 10, in case the client program 15 is selected.

The server 20 includes a code section containing instructions to receive information from the client 10 to switch between the client program 15 and the server program 25 during performance of the operation.

The server program 25 includes a first server module and a second server module for a second sub-operation; the client program 15 including a first client module and a second client module for a first sub-operation; wherein the operation includes the first and second sub-operation; and including a code section containing instructions to receive information on a selection of one of the first client module and the first server module to perform the first sub-operation; and one of the second client module the second server module to perform the second sub-operation.

The server 20 includes a code section containing instructions to at least one of transmit and receive instructions corresponding to the execution of the first or second module.

The operation at the server 20 includes at least one of visualizing the data file at the client 10 including rendering; editing the data file; and performing mathematical or logical operations on contents of the data file.

While the invention has been particularly shown with reference to the above embodiments, it will be understood by those skilled in the art that various other changes in the form and details may be made therein without departing from the spirit and the scope of the invention.

What is claimed is:

1. A method in a data processing system for one of local and remote processing of a data file at one of a client and a server, the method comprising the steps of:
   providing an option to choose one of a client and a server to perform respective first and second sub-operations of an operation on the data file at one of the client and the server, respectively, wherein the option to choose one of the client and the server is provided by displaying the option to choose one of the client and the server on a client display unit;
   receiving an indication of the chosen one of said client and said server to perform said respective first sub-operation and said second sub-operation on the data file using one of a client program and a server program, respectively, wherein the indication is received as a user input representing a user's choice of one of the client and the server, wherein said client program includes a first client sub-component for the first sub-operation and a second client sub-component for the second sub-operation, and wherein said server program includes a first server sub-component for the first sub-operation and a second server sub-component for the second sub-operation;
   choosing one of said first client sub-component and said first server sub-component to perform said first sub-operation;
   choosing one of said second client sub-component and said second server sub-component to perform said second sub-operation;
   performing said first sub-operation on the data file at said chosen one of the client and the server using one of said first client sub-component and said first server sub-component, respectively, and
   performing said second sub-operation on the data file at said chosen one of the client and the server using one of said second client sub-component and said second server sub-component, respectively.

2. The method according to claim 1, wherein the data file is retrieved at the client when said first client sub-component is chosen.

3. The method according to claim 1, wherein information is transmitted on the choice of said server to the server, and information is received on results of at least one of said first and second sub-operations at the server, when said server is chosen.

4. The method according to claim 1, further comprising the step of detecting whether said client program is available at the client and said server program is available at the server.

5. The method according to claim 1, further comprising the step of transmitting to the server an identifier of said server program and control information for controlling at least one of said first and second sub-operations, when said server is chosen.

6. The method according to claim 1, further comprising the step of instructing said chosen one of said client program and said server program to switch to another of said client program and said server program during performance of at least one of said first and second sub-operations.

7. The method according to claim 1, further comprising the step of receiving information on a pre-selection of one of the client and the server at an arbitrary point in time, wherein said pre-selection is one of the group comprising:
- a global pre-selection for all data files and operations;
- a pre-selection for a specific operation;
- a pre-selection for a specific data file; and
- a pre-selection for a specific operation in combination with a specific data file.

8. The method according to claim 1, wherein said option to choose is presented as at least one selection field that comprises one of buttons, a menu, a dialog box, and a roll-down window on the client display unit.

9. The method according to claim 1, further comprising at least one of the steps of:
- transmitting instructions corresponding to said one of said first and said second sub-operation on the data file; and
- receiving instructions corresponding to said one of said first and said second sub-operation on the data file.

10. The method according to claim 1, wherein said operation includes at least one of the steps of:
- visualizing the data file at the client including rendering the data file;
- editing the data file; and
- performing one of mathematical and logical operations on contents of the data file.

11. A computer readable storage medium containing instructions that cause a data processing system to perform a method of performing one of local and remote handling of a data file at one of a client and a server, the method comprising the steps of:
- providing an option to choose one of a client and a server to perform respective first and second sub-operations of an operation on the data file at one of the client and the server, respectively, wherein the option to choose one of the client and the server is provided by displaying the option to choose one of the client and the server on a client display unit;
- receiving an indication of the chosen one of said client and said server to perform said respective first sub-operation and said second sub-operation on the data file using one of a client program and a server program, respectively, wherein the indication is received as a user input representing a user's choice of one of the client and the server, wherein said client program includes a first client sub-component for the first sub-operation and a second client sub-component for the second sub-operation, and wherein said server program includes a first server sub-component for the first sub-operation and a second server sub-component for the second sub-operation;
- choosing one of said first client sub-component and said first server sub-component to perform said first sub-operation;
- choosing one of said second client sub-component and said second server sub-component to perform said second sub-operation;
- performing said first sub-operation on the data file at said chosen one of the client and the server using one of said first client sub-component and said first server sub-component, respectively, and
- performing said second sub-operation on the data file at said chosen one of the client and the server using one of said second client sub-component and said second server sub-component, respectively.

12. The computer readable storage medium according to claim 11, wherein the data file is retrieved at the client when said first client sub-component is chosen.

13. The computer readable storage medium according to claim 11, wherein information is transmitted on the choice of said server to the server, and information is received on results of at least one of said first and second sub-operations at the server, when said server is chosen.

14. The computer readable storage medium according to claim 11, further comprising the step of detecting whether said client program is available at the client and said server program is available at the server.

15. The computer readable storage medium according to claim 11, further comprising the step of transmitting to the server an identifier of said server program and control information for controlling at least one of said first and second sub-operations, when said server is chosen.

16. The computer readable storage medium according to claim 11, further comprising the step of instructing said chosen one of said client program and said server program to switch to another of said client program and said server program during performance of at least one of said first and second sub-operations.

17. The computer readable storage medium according to claim 11, further comprising the step of receiving information on a pre-selection of one of the client and the server at an arbitrary point in time, wherein said pre-selection is one of the group comprising:
- a global pre-selection for all data files and operations;
- a pre-selection for a specific operation;
- a pre-selection for a specific data file; and
- a pre-selection for a specific operation in combination with a specific data file.

18. The computer readable storage medium according to claim 11, wherein said option to choose is presented as at least one selection field that comprises one of buttons, a menu, a dialog box, and a roll-down window on the client display unit.

19. The computer readable storage medium according to claim 11, further comprising at least one of the steps of:
- transmitting instructions corresponding to said one of said first and said second sub-operation on the data file; and
- receiving instructions corresponding to said one of said first and said second sub-operation on the data file.

20. The computer readable storage medium according to claim 11, wherein said operation includes at least one of the steps of:
- visualizing the data file at the client including rendering the data file;
- editing the data file; and
- performing one of mathematical and logical operations on contents of the data file.

* * * * *